W. H. BARBER.

Improvement in Devices for holding Bits and other tools.

No. 4,736. Reissued Feb. 6, 1872.

Witnesses:
Robert H. Manuel.
Edmund E. Osborn.

Inventor:
Wm. H. Barber
Millers Falls Mfg Co
Assignee
Jno. C. A. Dingee
Atty

AM. PHOTO-LITHOGRAPHIC CO. N.Y. (OSBORNE'S PROCESS)

BEST AVAILABLE COPY 4,736

UNITED STATES PATENT OFFICE.

MILLER'S FALLS MANUFACTURING COMPANY, OF MILLER'S FALLS, MASSACHUSETTS, ASSIGNEES, BY MESNE ASSIGNMENTS, OF WILLIAM H. BARBER, DECEASED.

IMPROVEMENT IN DEVICES FOR HOLDING BITS AND OTHER TOOLS.

Specification forming part of Letters Patent No. 42,827, dated May 24, 1864; reissue No. 4,736, dated February 6, 1872.

Specification describing certain Improvements in Instruments for Holding Bits and other Tools, such instruments being commonly called "bit-stocks," "braces," or "drill-stocks," invented by WILLIAM HENRY BARBER, of Greenfield, in the county of Franklin and State of Massachusetts.

*Nature and Objects of the Invention.*

This invention relates to instruments for holding boring and analogous tools in the condition in which they are usually purchased, and without any previous fitting to the instrument or holder; and it consists in the combination and arrangement of parts hereinafter fully set forth.

*General Description.*

Figure 9:
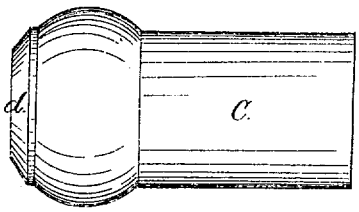
Figs. 8 and 9 show the sleeve-nut whole and in section.
Figure 7:
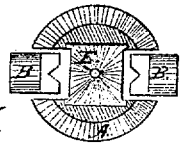
Figs. 6 and 7 show the ends of the jaws and their position in the slotted socket.
Figure 3:
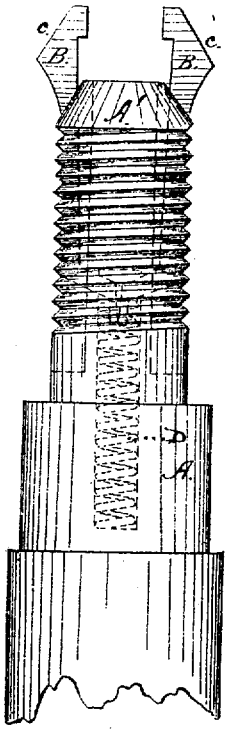
Fig. 3 shows the jaws inserted in the slotted socket.
Figure 2:
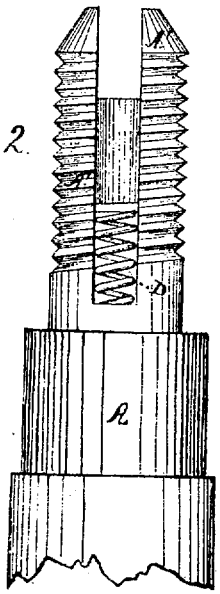
Fig. 2 shows the longitudinally-slotted socket in which the griping-jaws are placed and operated by a revolving nut.
Figure 8:
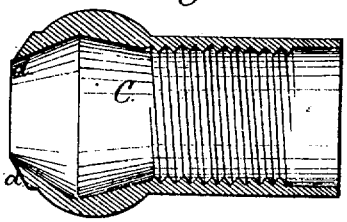
Figure 6:
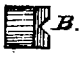

The instrument or holder consists of a central rod or piece, A, which is slotted longitudinally with a cutter, or cast in that way, to receive the two jaws B B. A sleeve-nut, C, is made to fit the screw-thread upon the periphery of the two parts which form the socket, and acts to close the jaws upon the tool. The socket is bored to receive a helical spring, D, for the purpose of opening the jaws. All these parts and their relative position to and operation with each other will be readily understood by a skilled mechanic. The jaws B B are constructed with their inner faces below the projection *c* straight, and with their lower ends terminating in the angle *a* and short tang *b*. The outer faces of the jaws are made inclined or wedge-shaped at the upper ends where they are operated upon by the sleeve-nut C. The upper ends of the jaws are heavier than the lower parts, and when placed with the tangs *b* together their upper ends will be a considerable distance apart. When about to gripe upon a boring-tool they will assume the position shown in Fig. 3. The upper ends of the jaws are nicked, as shown in Fig. 7, so as to grasp the corner or surface of a boring-tool. The slotted socket is a feature of great value in this invention, as it retains the jaws B B in proper position while admitting of their proper movements to gripe and release the boring-tool. The jaws B B are inserted in the longitudinally-slotted socket, as shown in Fig. 3, their tangs *b b* being inserted within or compassed by the spring D, as plainly shown. The sleeve-nut C is cast long and its outer surface milled or roughened so as to afford a good grasping-surface for the hand to force the jaws upon the tool and hold it firmly, and its internal diameter is enlarged and made tapering at its upper end *d* to fit the taper of the jaws, as shown in the section, Fig. 8.

Figure 1:
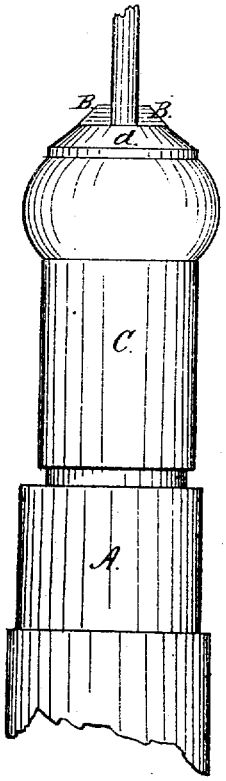
Figure 1 shows the holder with the jaws closed upon a tool ready for use.
Figure 5:
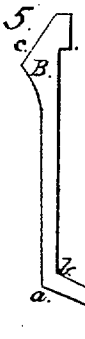
Figs. 4 and 5 show the jaws removed from the socket and their peculiar shape.
Figure 4:
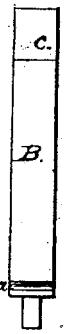

The operation of this instrument is as follows: The sleeve-nut C is screwed upon the slotted socket, with the jaws B B in the position shown in Fig. 3, and the tang of a tool is inserted in the socket between the jaws, when the nut C is screwed down and acts to close the jaws by its internal tapering surface striking upon the inclined faces of the jaws and pressing them together, and at the same time moving them longitudinally and drawing them into the socket E. The jaws B are firmly griped in this manner upon the tool, as shown in Fig. 1.

It is of great advantage in an instrument of this kind to have the jaws automatically opened, and this is effected by the spring D. When the jaws, occupying the position shown in Fig. 3, are forced together so that their upper edges approach each other, as seen in Fig. 1, the lower ends will form a fulcrum on the socket E at the point B, and the tangs will be forced apart against the sides of the spring which surrounds them, so that when the upper ends of the jaws are released at the griping point the springs will act upon the tangs to cause them to approach each other, and thus open the jaws at the upper end where the tool is inserted.

We are aware that jaws tapering upon their outer surface and made to close by a tapering nut have been used in awl-holders; an example of which may be seen in the patent granted Dexter H. Chamberlain, February 7, 1854, for an awl-holder; and such a device is therefore disclaimed. We are also aware that a split or slotted gripe screwing into a nut in an awl-handle has been used, and that the grasping parts of said mandrel would open slightly by reason of their inherent elasticity; an example of which may be seen in the patent granted to Dexter H. Chamberlain, May 20, 1848; and we therefore disclaim such a device.

What is claimed as the invention of WILLIAM HENRY BARBER is—

1. The combination and arrangement of the longitudinally-slotted socket A, jaws B B, resting and operating within the socket, and a sleeve-nut, C, operating upon the periphery of the socket, all co-operating together for a tool-holder, substantially in the manner described and specified.

2. The jaws B B, constructed substantially as described and specified.

3. Automatically opening the jaws B B to receive and release the tool by a spring applied to their non-grasping ends, constructed and operating substantially as described and specified.

H. L. PRATT,
*Pres. Miller's Falls Mfg. Co.*

Witnesses:
E. P. STOUGHTON,
EDWARD E. OSBORN.